Nov. 30, 1926.
E. SLUSSER
1,608,823
ILLUMINATED SAFETY BUMPER
Filed May 14, 1926
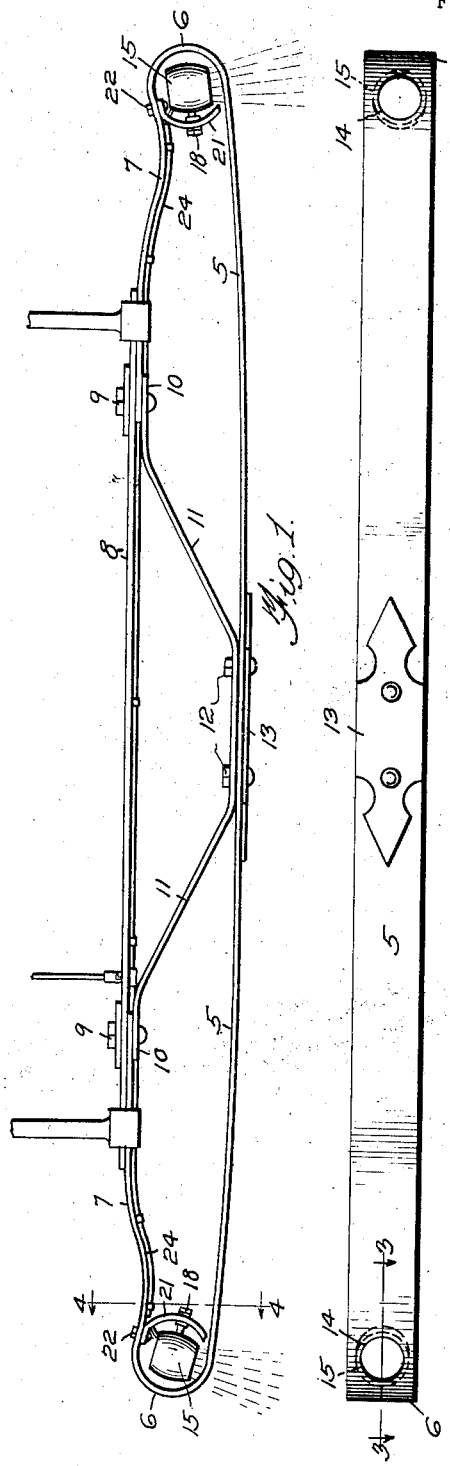
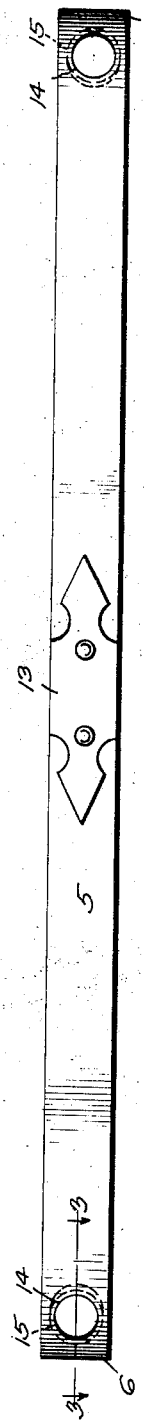
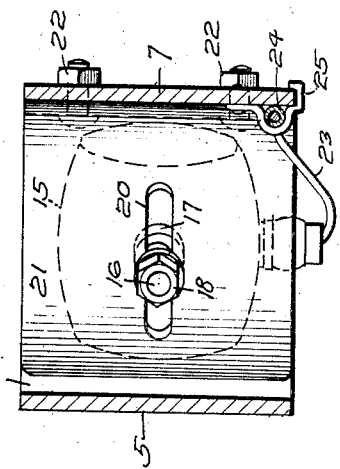
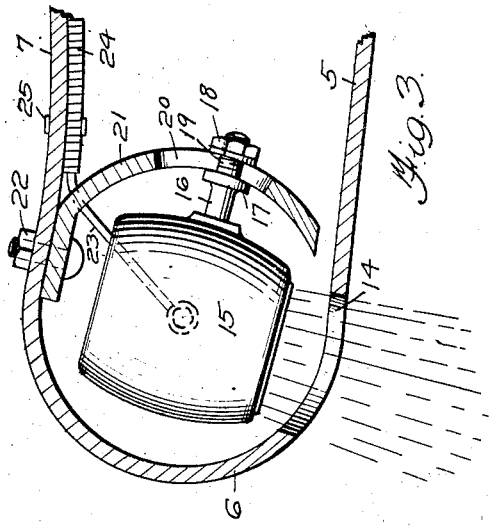
Inventor
Eugene Slusser
By Shepherd Campbell
Attorneys Patented Nov. 30, 1926.

1,608,823

UNITED STATES PATENT OFFICE.

EUGENE SLUSSER, OF SANTA ROSA, CALIFORNIA.

ILLUMINATED SAFETY BUMPER.

Application filed May 14, 1926. Serial No. 109,071.

This invention relates to an illuminated safety bumper of the character of that illustrated in United States Patent 1,577,937 issued to me on March 23, 1926.

The bumper of the present invention like the bumper of the patent referred to has for its object to associate with an automobile bumper, light, arranged to delimit the width of the vehicle by which the bumper is carried.

As stated in the specification of my prior patent many serious accidents have been caused because the driver of one vehicle, dazzled by the lights of an approaching vehicle, has been unable to judge with accuracy the position of said other vehicle and consequently has collided with the same.

By locating lights which are not of such brilliancy as to dazzle but which accurately indicate the extreme width of the vehicle at the extremities of the bumper such accidents may be largely prevented.

It is intended to use the lamps both in conjunction with front and rear bumpers though they have their greatest utility when used with the front bumper.

More particularly the present invention resides in providing a bumper of the character indicated wherein the lights are practically completely housed between the front and rear runs of the bumper and wherein the bumper is provided with openings for the passage of the light rays.

A further object of the invention is to provide improved means for rendering said lamps adjustable both in vertical and horizontal planes.

In the accompanying drawing—

Fig. 1 is a plan view of a bumper constructed in accordance with the invention.

Fig. 2 is a front elevation thereof.

Fig. 3 is an enlarged horizontal sectional view on line 3—3 of Fig. 2 and

Fig. 4 is an enlarged vertical sectional view upon line 4—4 of Fig. 1.

Like numerals designate corresponding parts in all of the figures of the drawing.

The bumper of the present invention comprises a front run 5 of flat resilient metal which is bent into the loops 6 at its ends and is continued to form parts of the rear run at 7. The ends 7 are connected by a strip 8, said strip and said ends being traversed by bolts, rivets or like fastening devices 9. The fastening devices also engage the ends 10 of a brace 11. The central portion of this brace is traversed by bolts, rivets or other suitable fastening devices 12 by which it is secured to the front run 5. Incidentally, said fastening devices secure an ornamental plate 13 in position.

The front portions of the looped ends 6 of the bumper, are provided with openings 14 for the passage of light rays from small electric lamps 15. Studs 16 project from the sides of these lamps and are provided with collars 17 and tightening nuts 18. The portions of the studs indicated at 19, which lie between the collars 17 and the nuts and washers 18, pass through elongated horizontally disposed slots 20, formed in curved plates 21, which are secured by bolts, rivets or like fastening devices 22, to the rear ends 7. These curved plates in conjunction with the loops at the outer ends of the bumper, form almost complete housings for the lamps 15. If the nuts 18 be loosened, the lamps may be adjusted both vertically and horizontally. That is, they may be adjusted to direct their rays either upwardly or downwardly by turning the lamps bodily about the axes constituted by the studs 16, or they may be swung to varying positions of horizontal adjustment by sliding the studs back and forth in the slots 20. It will of course be understood that after the proper adjustment has been secured the nuts 18 will be tightened. Current may be supplied to the lamps through any suitable conductor 23 and this conductor may be secured in any desired manner to the bumper or it may be passed through a conduit 24, and said conduit may, in turn, be secured to the rear run of the bumper by clips 25. It is to be understood that it is immaterial from the standpoint of the invention just how the conductor is housed or whether it is housed at all. Further it is to be understood that the invention is not limited to the particular construction herein shown and described but it is intended to cover, broadly, the thought of housing lights of this character within the bumper herein shown and described, or in any equivalent way.

Having described my invention what I claim is:

1. A device of the character described comprising a bumper having a horizontally slotted part a lamp housed within said bumper and carrying a stud extending substantially at right angles to the axis of said lamp which passes through the slot of said part, and a binding means for tightening said stud in said slot, the movement of the lamp about the axis constituted by said stud affecting a vertical adjustment thereof and movement of the stud in the slot affecting the horizontal adjustment thereof.

2. A bumper of the character described comprising front and rear runs and looped portions at the opposite ends thereof and curved plates which with the looped portions of the end constitute housings for lamps, electric lamps in said housings and means for supporting said lamps from said plates.

3. A structure as recited in claim 2 wherein said means comprise studs carried by the lamps which pass through slotted portions of said plates and nuts threaded upon said studs for binding said lamps against movement in said slot.

In testimony whereof I affix my signature.

EUGENE SLUSSER.